United States Patent
Li

(10) Patent No.: US 9,323,098 B2
(45) Date of Patent: Apr. 26, 2016

(54) COLOR FILTER SUBSTRATE, LIQUID CRYSTAL PANEL, AND LIQUID CRYSTAL DISPLAY DEVICE

(71) Applicant: BEIJING BOE OPTOELECTRONICS TECHNOLOGY CO., LTD., Beijing (CN)

(72) Inventor: Yue Li, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 3 days.

(21) Appl. No.: 14/055,201

(22) Filed: Oct. 16, 2013

(65) Prior Publication Data

US 2014/0104550 A1 Apr. 17, 2014

(30) Foreign Application Priority Data

Oct. 16, 2012 (CN) .......................... 2012 2 0529078

(51) Int. Cl.
*G02F 1/1335* (2006.01)

(52) U.S. Cl.
CPC .... *G02F 1/133514* (2013.01); *G02F 1/133555* (2013.01); *G02F 2203/09* (2013.01)

(58) Field of Classification Search
CPC ................... G02F 1/133514; G02F 1/133555; G02F 2203/09
USPC .................. 349/106–109, 113–114
See application file for complete search history.

(56) References Cited

U.S. PATENT DOCUMENTS

| 7,463,317 B2* | 12/2008 | Takizawa et al. ............. 349/114 |
| 2002/0126238 A1 | 9/2002 | Matsushita et al. |
| 2002/0196395 A1 | 12/2002 | Ha |
| 2003/0063239 A1* | 4/2003 | Suzuki ............. G02F 1/133514 349/106 |
| 2003/0179327 A1* | 9/2003 | Nonaka et al. ................. 349/106 |
| 2005/0030448 A1* | 2/2005 | Huh et al. ...................... 349/106 |
| 2008/0180611 A1* | 7/2008 | Minato et al. .................. 349/106 |

FOREIGN PATENT DOCUMENTS

EP 1764645 A1 3/2007

OTHER PUBLICATIONS

Extended European Search Report dated Jan. 27, 2014; Appln. No. 13188973.5-1904.

* cited by examiner

*Primary Examiner* — Charles Chang
(74) *Attorney, Agent, or Firm* — Ladas & Parry LLP

(57) ABSTRACT

Embodiments of the present invention provide a color filter substrate, a liquid crystal panel and a liquid crystal display device. The color filter substrate is used for a transflective LCD device, and comprises: a color filter layer including a reflective region color photoresist corresponding to a reflective region of the transflective liquid crystal display device and a transmissive region color photoresist corresponding to a transmissive region of the transflective liquid crystal display device, wherein the reflective region color photoresist and the transmissive region color photoresist are the same in concentration of colored particles, the average size of the colored particles in the reflective region color photoresist is smaller than that of the colored particles in the transmissive region color photoresist.

11 Claims, 2 Drawing Sheets

COLOR FILTER SUBSTRATE, LIQUID CRYSTAL PANEL, AND LIQUID CRYSTAL DISPLAY DEVICE

FIELD OF THE INVENTION

Embodiments of the invention relate to a color filter substrate, a liquid crystal panel and a liquid crystal display device.

BACKGROUND

As transflective technology has become more mature, transflective LCD devices are increasingly popular in today's LCD market. In the design of a transflective LCD device including a reflective region R and a transmissive region T, a reflective layer made of a metal with high reflectivity (for example, aluminum) is provided in the reflective region, and color photoresists, in a color filter layer, corresponding respectively to the reflective region and the transmissive region are made of materials with the same transmissivity. An shown in FIG. 1, in an existing transflective LCD, light passes through the color photoresist only once in the transmissive region T, while light passes through the color photoresist twice in the reflective region R, hence greatly reducing the reflection efficiency of light in the reflective region, deteriorating the intensity uniformity of light emitted from pixels, and adversely affect the display quality of the products.

Therefore, an object of embodiments of the present invention is to enhance the intensity uniformity of light emitted from pixels of a transflective LCD device.

SUMMARY

An embodiments of the present invention provides a color filter substrate for a transflective liquid crystal display device, comprising a color filter layer including a reflective region color photoresist corresponding to a reflective region of the transflective liquid crystal display device and a transmissive region color photoresist corresponding to a transmissive region of the transflective liquid crystal display device, wherein the reflective region color photoresist and the transmissive region color photoresist are the same in concentration of colored particles, the average size of the colored particles in the reflective region color photoresist is smaller than that of the colored particles in the transmissive region color photoresist.

Alternatively, an opening is provided in the reflective region color photoresist.

Alternatively, the opening does not penetrate the reflective region color photoresist.

Alternatively, a transparent resin is provided on the reflective region color photoresist.

Alternatively, the opening is in the shape of a circle.

Alternatively, the opening is in the shape of a rectangle.

Alternatively, the color filter layer has a color gamut of 50% to 75%.

Alternatively, the reflective region color photoresist has a light transmittance of 25% to 40%, the transmissive region color photoresist has a light transmittance of 15% to 25%.

Alternatively, the diameter of the colored particles in the reflective region color photoresist is smaller than that of the colored particles in the transmissive region color photoresist.

Another embodiment of the present invention provides a liquid crystal panel comprising a color filter substrate described as above, an array substrate and a color filter substrate bonded with each other, and a liquid crystal molecular layer disposed between the array substrate and the color filter substrate.

A further embodiment of the present invention provides a liquid crystal display device, comprising the liquid crystal panel described as above.

BRIEF DESCRIPTION OF THE DRAWINGS

In order to clearly illustrate the technical solutions of embodiments of the present invention, in the following, the accompanying drawings of the embodiments will be described briefly; it is obvious that the following description of the drawings only relates to some embodiments of the invention and thus is not limitative of the invention.

DETAILED DESCRIPTION

In connection with the accompanying drawings related to the embodiments of the present invention, the technical solutions of the embodiments will be described in a clear and fully understandable way; it is obvious that the described embodiments are just one part but not all of the embodiments of the invention. Based on the embodiments of the present invention, those skilled in the art can obtain other embodiment(s), without any inventive work, which should be within the scope of the invention.

First Embodiment

Figure 1:
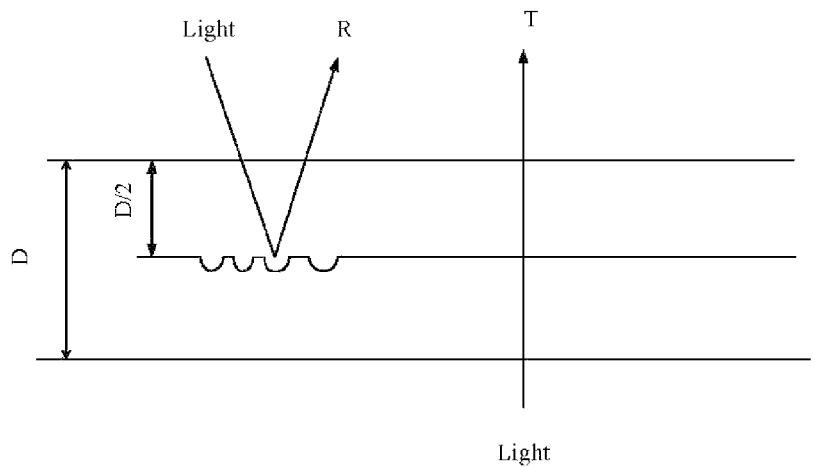
FIG. 1 is a schematic diagram showing the propagation of light within an existing transflective LCD device.
Figure 2:
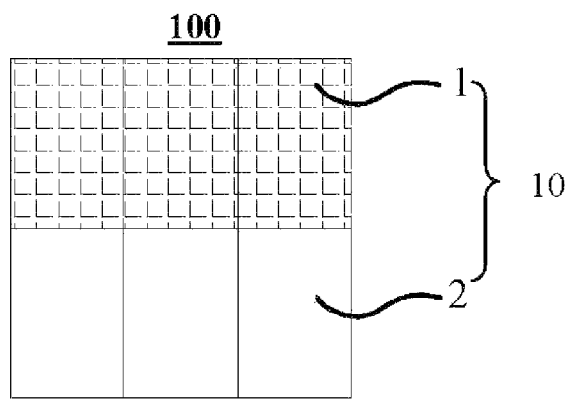
FIG. 2 is a schematic top view of the structure in a pixel unit of a color filter substrate in accordance with an embodiment of the present invention.

The embodiment of the present invention provides a color filter substrate used in a transflective LCD device. The display area of the transflective LCD device is comprised of plural pixel units arranged in a matrix, each of which has a reflective region and a transmissive region. Although the color filter substrate provided by the embodiment of the present invention is to be described mainly with regard to one or more pixel unit(s) therein, other pixel unit(s) of the color filter substrate provided by the embodiment of the present invention can be formed with the same structures as the one or more pixel unit(s). As shown in FIG. 2, the color filter substrate 100 comprises, for example, a color filter layer 10 formed on a glass substrate (no shown in FIG. 2). The color filter layer 10, in each pixel unit, has a reflective region color photoresist 1 and a transmissive region color photoresist 2 corresponding to the reflective region and the transmissive region of the pixel unit respectively. For example, the reflective region color photoresist 1 is formed in the reflective region of the pixel unit, while the transmissive region color photoresist 2 is formed in the transmissive region of the pixel unit.

The concentration of colored particles in the reflective region color photoresist 1 is the same as that in the transmissive region color photoresist 2, while the average size of the colored particles in the reflective region color photoresist 1 is smaller than that in the transmissive region color photoresist 2. In an example, the colored particles dispersed in the reflective region color photoresist 1 are of a uniform size, and the colored particles dispersed in the transmissive region color photoresist 2 are also of a uniform size. Furthermore, the diameter of the colored particles in the reflective region color photoresist 1 is smaller than that of the colored particles in the transmissive region color photoresist 2.

The color filter substrate 100 provided by the embodiment of the present invention can be used in a transflective LCD device comprising a reflective region and a transmissive region. Under a strong outdoor radiation, for example, environmental light passes through components such as the upper glass substrate, impinges onto the color filter layer 10 of the color filter substrate 100, passes through the reflective region color photoresist 1 of the color filter layer 10 and gets reflected by the reflective components in the reflective region of the LCD device, once again passes through the reflective region color photoresist 1 of the color filter layer 10, and finally exits from the reflective region of the transflective LCD device. Light emitted from the backlight of the LCD device passes through the transmissive region color photoresist 2 of the color filter layer 10 of the color filter substrate 100 and exits from the transmissive region of the transflective LCD device. Light exiting from the reflective region and light exiting from the transmissive region together form light emitted from the pixel, and produces an image on the screen of the transflective LCD device.

With regard to two color photoresists having the same concentration of colored particles dispersed therein, the colored particles of smaller diameter block less light, due to larger space formed therebetween. In the embodiment of the present invention, the reflective region color photoresist 1 and the transmissive region color photoresist 2 are the same in concentration of the colored particles, while the diameter of the colored particles in the reflective region color photoresist 1 is smaller than that of the colored particles in the transmissive region color photoresist 2. Hence, the colored particles in the reflective region color photoresist 1 block less light due to larger space formed therebetween. That is, the reflective region color photoresist 1 has a light transmittance higher than the transmissive region color photoresist 2. Therefore, although light exiting from the reflective region passes through the reflective region color photoresist 1 twice and light exiting from the transmissive region passes through the transmissive region color photoresist 2 only once, light emitted from the pixels of the transflective LCD device provided with the color filter layer 10 has good intensity uniformity, due to the distribution of the colored particles dispersed in the reflective region color photoresist 1 and the transmissive region color photoresist 2.

By using the color filter substrate in accordance with the embodiment of the present invention, light loss in the reflective regions of the transflective LCD device can be considerably reduced, hence enhancing the intensity uniformity of light emitted from pixels.

Figure 3:
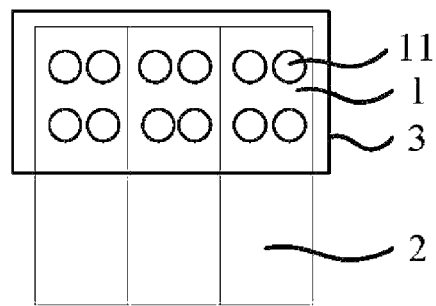
FIG. 3 is a schematic top view of the structure in a pixel unit of a color filter substrate in accordance with another embodiment of the present invention.

In an example, as shown in FIG. 3, openings 11 can be provided in the reflective region color photoresist 1. The openings 11 provided in the reflective region color photoresist 1 allow environmental light to pass through, hence effectively reducing reflection losses.

Alternatively, openings 11 can be formed to not penetrate the color filter layer 10.

Furthermore, transparent resin 3 can be provided on the reflective region color photoresist 1, so as to enhance the intensity uniformity of the reflected light.

Figure 4:
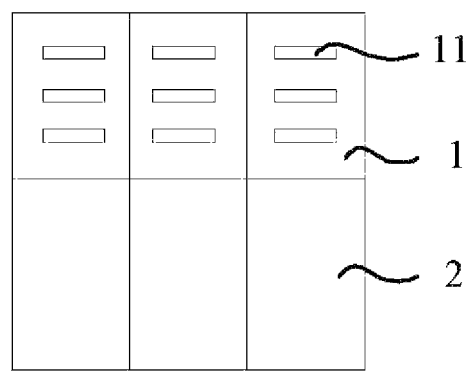
FIG. 4 is a schematic top view of the structure a pixel unit of a color filter substrate in accordance with a further embodiment of the present invention.

The openings 11 described in the above example can be in the shape of a circle or a rectangle as shown in FIG. 4. Other shapes of the openings 11, such as a square, can also be adopted and not described in detail herein.

Alternatively, the color filter layer has a color gamut from 50% to 75%, the reflective region color photoresist 1 has a light transmittance of 25% to 40%, and the transmissive region color photoresist 2 has a light transmittance of 15% to 25%.

In an embodiment of the present invention, the color gamut of a color filter layer is 70% and kept constant, for example, the reflective region color photoresist 1 has a light transmittance of 34%, and the transmissive region color photoresist 2 has a light transmittance of 25%.

The color filter substrate in accordance with an embodiment of the present invention, described as above with reference to FIG. 2, can be prepared by the following method comprising:

Step S11: forming a black matrix pattern on a glass substrate, so as to define a plurality of pixel units.

This step for example includes: coating the glass substrate with a resin layer for the black matrix layer, and patterning the resin layer by photolithography and etching process so as to form the black matrix pattern.

Step S12: forming patterns of the reflective region color photoresist 1 including a red photoresist pattern, a green photoresist pattern and a blue photoresist pattern in the reflective region of each pixel unit.

This step for example includes: fruiting the red photoresist pattern, the green photoresist pattern, and the blue photoresist pattern in the reflective region of each pixel unit by using a color photoresist material having a light transmittance of 34% and by photolithography and etching process.

Step S13: forming patterns of the transmissive region color photoresist 2, which include a red photoresist pattern, a green photoresist pattern and a blue photoresist pattern in the transmissive region of each pixel unit.

This step for example includes: forming the red photoresist pattern, the green photoresist pattern, and the blue photoresist pattern in the transmissive region of each pixel unit by using a color photoresist material having a light transmittance of 25% and by photolithography and etching process.

Step S14: depositing a transparent electrode layer by a physical vapor deposition (PVD) process and patterning the transparent electrode layer to form a common electrode.

In the Step S13 described as above, for example, it is not necessary to use a new mask plate, but instead reuse the mask plate adopted in the Step S12 to form the pattern of the reflective region color photoresist 1; that is, the pattern of the transmissive region color photoresist 2 can be formed by moving the mask plate or the glass substrate, so as to use the mask plate more economically.

As illustrated above with reference to FIG. 2, the color filter substrate in accordance with the present invention can be used in the transflective LCD device. The display area of the transflective LCD device is comprised of plural pixel units, each of which has a reflective region and a transmissive region. In the reflective region of each pixel unit, environmental light passes through the reflective region color photoresist 1 of the color filter layer, impinges on the reflective components, gets reflected back by the reflective components and finally exits from the reflective region. On the other hand, in the transmissive region of the transflective LCD device, light emitted from the backlight source passes through the transmissive region color photoresist 2 of the color filter layer, and exits from the transmissive region. Light exiting from both the reflective region and the transmissive region together form the light emitted from the pixel, so as to produce an image. Though light exiting from the reflective region passes through the reflective region color photoresist 1 twice, while light exiting from the transmissive region passes through the transmissive region color photoresist 2 only once, light emitted from the pixel will still have good intensity uniformity, as the reflective region color photoresist 1 has a light transmittance higher than that of the transmissive region color photoresist 2.

As illustrated above with reference to FIG. 3 and FIG. 4, the color filter substrate in accordance with the present invention can be prepared by the following method comprising:

Step S21: forming a black matrix pattern on a glass substrate, for defining a plurality of pixel units.

This step includes: coating the glass substrate with a resin layer for forming a black matrix layer; and patterning the resin layer so as to form the black matrix pattern by a photolithography and etching process.

Step S22: forming patterns of the reflective region color photoresist 1 including a red photoresist pattern, a green photoresist pattern and a blue photoresist pattern in the reflective region of each pixel unit.

This step, for example, includes: forming red photoresist patterns, green photoresist patterns, and blue photoresist patterns within each pixel unit by using a color photoresist material having a light transmittance of 34% and by photolithography and etching processes.

Step S23: forming patterns of the transmissive region color photoresist 2, which include a red photoresist pattern, a green photoresist pattern and a blue photoresist pattern in the transmissive region of each pixel unit.

This step for example includes: forming the red photoresist pattern, the green photoresist pattern, and the blue photoresist pattern in the transmissive region of each pixel unit by using a color photoresist material having a light transmittance of 25% and by a photolithography and etching process.

Step S24: forming openings 11 on the patterns of the reflective region color photoresist 1.

Step S25: coating the reflective region color photoresist 1 with a transparent resin layer, and forming patterns of the transparent resin 3 by a photolithography process.

Step S26: depositing a transparent electrode layer by a physical vapor deposition (PVD) process and patterning the transparent electrode layer to form a common electrode.

As illustrated above with reference to FIG. 3 and FIG. 4, the color filter substrate in accordance with the present invention can be used in a transflective LCD device. The display area of the transflective LCD device is comprised of plural pixel units, each of which has a reflective region and a transmissive region. In the reflective region of each pixel unit, environmental light passes through the reflective region color photoresist 1 with openings 11, impinges on the reflective components in the reflective region, gets reflected back by the reflective components, and once again passes through the reflective region color photoresist 1 with openings 11, gets converged by the transparent resin 3, and finally exits from the reflective region. In the transmissive region, light emitted from the backlight source passes through the transmissive region color photoresist 2 and exits therefrom. Light exiting from both the reflective region and the transmissive region together form the light emitted from pixels and produces an image. Light exiting from the reflective region passes through the reflective region color photoresist twice, while light exiting from the transmissive region passes through the transmissive region color photoresist only once. However, as the reflective region color photoresist 1 has a light transmittance higher than that of the transmissive region color photoresist 2 and the reflective region color photoresist 1 is provided with openings 11, light exits from the reflective region will less loss, hence enhancing the intensity uniformity of the light emitted from the pixels.

Embodiments of the present invention further provide a liquid crystal panel comprising an array substrate and a color filter substrate bonded with each other, and a liquid crystal molecular layer disposed between the array substrate and the color filter substrate. The color filter substrate used in the liquid crystal panel is the color filter substrate provided in the embodiments described above. The array substrate comprises a plurality of gate lines and data lines formed to cross each other and define a plurality of pixel units. Each of the pixel units, on the array substrate, comprises a thin film transistor used as a switching element, and a pixel electrode used to control the alignment of liquid crystal material. The pixel electrodes of each pixel unit, provided on the array substrate, are used to apply an electric field, so as to control the rotation of the liquid crystal material and create an image. In each pixel unit, the gate electrode of the thin film transistor and the corresponding gate line are electrically connected or integrally formed, the source electrode and the corresponding data line are electrically connected or integrally formed, and the drain electrode and the corresponding pixel electrode are electrically connected or integrally formed.

The liquid crystal panel in accordance with an embodiment of the present invention can greatly improve the display quality of a LCD product.

An embodiment of the present invention further provides a LCD device, comprising, for example, the liquid crystal panel in the embodiments described above.

In some examples, the LCD device further includes a backlight source for providing backlight for the liquid crystal panel.

The LCD device in accordance with the embodiment of the present invention has an improved display effect.

Although the present invention has been described in considerable detail with reference to preferred embodiments thereof, some modifications or improvements can still be made on the basis of the present invention, which is evident to those skilled in the art. Therefore, those modifications and/or improvements, which are made without departing from the spirit of the present invention, all belong to the protection scope of the present invention.

What is claimed is:

1. A color filter substrate for a transflective LCD device, comprising a color filter layer including a reflective region color photoresist corresponding to a reflective region of the transflective liquid crystal display device and a transmissive region color photoresist corresponding to a transmissive region of the transflective liquid crystal display device, wherein the reflective region color photoresist and the transmissive region color photoresist are the same in concentration of colored particles, the average size of the colored particles in the reflective region color photoresist is smaller than that of the colored particles in the transmissive region color photoresist.

2. The color filter layer according to claim 1, wherein an opening is provided in the reflective region color photoresist but not overlapped with the edge of the reflective region color photoresist or the edge of the transmissive region color photoresist.

3. The color filter layer according to claim 2, wherein the opening does not penetrate the reflective region color photoresist.

4. The color filter layer according claim 3, wherein a transparent resin is provided on the reflective region color photoresist.

5. The color filter layer according to claim 2, wherein the opening is in the shape of a circle.

6. The color filter layer according to claim 2, wherein the opening is in the shape of a rectangle.

7. The color filter layer according to claim 1, wherein the color filter layer has a color gamut of 50% to 75%.

8. The color filter layer according to claim 7, wherein the reflective region color photoresist has a light transmittance of 25% to 40%, and the transmissive region color photoresist has a light transmittance of 15% to 25%.

9. The color filter layer according to claim 1, wherein the diameter of the colored particles in the reflective region color photoresist is smaller than that of the colored particles in the transmissive region color photoresist.

10. A liquid crystal panel comprising the color filter substrate according to claim 1, an array substrate and a color filter substrate bonded with each other, and a liquid crystal molecular layer disposed between the array substrate and the color filter substrate.

11. A liquid crystal display device comprising the liquid crystal panel according to claim 10.

* * * * *